United States Patent
Gross et al.

(10) Patent No.: US 7,292,962 B1
(45) Date of Patent: Nov. 6, 2007

(54) TECHNIQUE FOR DETECTING CHANGES IN SIGNALS THAT ARE MEASURED BY QUANTIZATION

(75) Inventors: Kenneth C. Gross, San Diego, CA (US); Keith Whisnant, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 602 days.

(21) Appl. No.: 10/809,721

(22) Filed: Mar. 25, 2004

(51) Int. Cl.
*G06F 11/00* (2006.01)

(52) U.S. Cl. .................. 702/186; 702/57; 702/179; 702/182

(58) Field of Classification Search .................. 702/57, 702/179, 186, 189, 191; 708/827; 327/307; 330/9; 331/17; 324/601, 654; 714/26, 157; 376/157

See application file for complete search history.

(56) References Cited

U.S. PATENT DOCUMENTS

| | | | | |
|---|---|---|---|---|
| 5,218,486 A | * | 6/1993 | Wilkinson | 360/27 |
| 5,841,377 A | * | 11/1998 | Takamizawa et al. | 341/51 |
| 6,147,501 A | * | 11/2000 | Chodora | 324/601 |
| 6,377,840 B1 | * | 4/2002 | Gritsenko et al. | 600/476 |
| 6,961,862 B2 | * | 11/2005 | Best et al. | 713/401 |
| 7,023,581 B2 | * | 4/2006 | Soler et al. | 358/1.9 |
| 7,085,675 B2 | * | 8/2006 | Wegerich | 702/181 |
| 2005/0188263 A1 | * | 8/2005 | Gross et al. | 714/25 |

OTHER PUBLICATIONS

Ohki et al., 'Design Support to Determine the Range of Design Parameters by Qualitative Resoning', May 1994, IEEE Publication, vol. 24, No. 5, pp. 813-819.*

* cited by examiner

*Primary Examiner*—Eliseo Ramos-Feliciano
*Assistant Examiner*—Elias Desta
(74) *Attorney, Agent, or Firm*—Osha Liang LLP

(57) ABSTRACT

A technique for detecting changes in a signal that is measured and reported by quantization uses a model that is updated in response to the sampling of quantized values representing the signal. In one stage, (i) frequencies of occurrences of different sampled quantized values in the stage are calculated and (ii) mean frequencies for each of the different sampled quantized values in the stage are calculated and recorded. In a next stage, frequencies of occurrences of different sampled quantized values occurring after an end of the preceding stage are calculated and statistically compared with the mean frequencies of the different sampled quantized values determined in the preceding stage. Dependent on this comparison, a notification may be issued indicating the signal is anomalously changing.

28 Claims, 4 Drawing Sheets

US 7,292,962 B1

TECHNIQUE FOR DETECTING CHANGES IN SIGNALS THAT ARE MEASURED BY QUANTIZATION

BACKGROUND OF INVENTION

A typical computer environment, as shown in FIG. 1, involves one or more "client" computing systems 14, 16, 18, 20 that are connected over a network (e.g., the Internet) 12 to a "server" computing system 10. Such a client/server computing model describes the relationship between at least two computing systems in which one system, the client, requests services (e.g., requests data) from another system, the server, which, in turn, fulfills the service request. Further, the client/server computing model provides a convenient way to interconnect programs that are distributed across different locations.

FIG. 2 shows a typical computing system 30, which may be representative of either the client computing systems 14, 16, 18, 20 or the server computing 10 system shown in FIG. 1. The typical computing system 30 includes: memory 32 for storing data and instructions necessary for the operation of the computing system 30, a microprocessor 36 for processing data and performing computing operations requested by a user or other computing system, a bus 38 for enabling the transmission of data between the various components of the computing system 30, and a network interface 34 for enabling communication of information between the computing system 30 and the network 12. Those skilled in the art will recognize that various other components may be used as part of, and together with, the computing system 30.

In order to monitor various physical variables associated with the operation of the computing system 30, several physical sensors 40, 42, 44, 46, 48 may be selectively positioned throughout the computing system 30. These physical sensors 40, 42, 44, 46, 48 measure, at specific points of interest, physical variables such as voltages, temperature, and current. For example, physical sensor 40 may monitor a particular voltage provided to a bank of storage cells (not shown) in the memory 32. Further, for example, physical sensor 48 may monitor a temperature at a particular location in the microprocessor 36.

FIG. 2 also shows a type of component 49 typically used in conjunction with, or as part of, a physical sensor. This component is referred to and known as an "analog-to-digital" converter 49. The analog-to-digital converter 49 converts continuous, analog signals to discrete, digital values. Analog-to-digital converters 49 are especially needed in computing systems having digital components (e.g., microcontrollers) that are unable to handle (or poorly handle) analog signals.

The analog-to-digital converter 49 shown in FIG. 2 is an 8-bit analog-to digital converter, meaning that the digital value generated from the analog-to-digital converter 49 is represented using 8 bits. The digital value generated by the analog-to-digital converter 49 is dependent on (i) sampling an analog input Vin at a rate of a clock signal CLK provided to the analog-to-digital converter 49 and (ii) referencing the analog input Vin to a reference voltage Vref and ground GND. Accordingly, based on the analog input Vin (and the other inputs to the analog-to-digital converter 49 shown in FIG. 2), the analog-to-digital converter 49, having a resolution of 8 bits, is capable of generating any one of $2^8$, or 256, discrete values. Analog-to-digital converters having resolutions different than that of the analog-to-digital converter 49 shown in FIG. 2 operate similarly, albeit that a digital value generated by such a analog-to-digital converter is one of a lesser or greater amount of discrete values depending on the resolution of that particular analog-to-digital converter. For example, a 4-bit analog-to-digital converter is only capable of outputting any one of $2^4$, or 16, discrete values, whereas a 10-bit analog-to-digital converted is capable of outputting any one of $2^{10}$, or 1024, discrete values.

The process of approximating a continuous, analog signal with a discrete value is referred to an known as "quantization." More particularly, the process of quantization involves subdividing an allowable continuous input range into a finite number of regions of fixed increment.

An output of a analog-to-digital converter is referred to as "quantized," that is, the analog-to-digital converter functions by determining an appropriate region to assign a given analog input. With respect to, for example, an 8-bit analog-to-digital converter capable of generating any one of $2^8$, or 256, discrete values, the output of the 8-bit analog-to-digital converter is quantized to the nearest hundredth of a volt. For example, an analog input of 1.6035 V would be reported by the 8-bit analog-to-digital converter as 1.60 V (in binary form). Thus, those skilled in the art will recognize that the process of quantization has the potential to introduce an inaccuracy similar to rounding error, which is referred to and known as "quantization error." However, quantization is an efficient, and often necessary, technique for measuring physical variables of interest in modern digital computing systems.

SUMMARY OF INVENTION

According to one aspect of one or more embodiments of the present invention, a method for determining whether a physical variable in a computer system is changing, where values of the physical variable are reported as quantized values, comprises: updating a current frequency of occurrences of a particular quantized value in response to an occurrence of the particular quantized value; determining whether the current frequency is statistically different than a reference mean frequency of the particular quantized value; and selectively issuing an indication that the physical variable is changing dependent on the determining.

According to another aspect of one or more embodiments of the present invention, a method for determining a change in a signal that is measured by quantization comprises a first stage, a second stage, and a third stage. With respect to the first stage, the method comprises (i) sampling a first plurality of quantized values and (ii) updating a frequency of occurrences for each different quantized value in the first plurality of quantized values. With respect to the second stage, the method comprises (i) sampling a second plurality of quantized values, (ii) updating a frequency of occurrences for each different quantized value in the second plurality of quantized values, and (iii) continuously updating and storing a reference mean frequency and variance for each different quantized value in the second plurality of quantized values. With respect to the third stage, the method comprises (i) sampling a third plurality of quantized values, (ii) determining a current frequency of occurrences of a particular quantized value in response to sampling the particular quantized value in the third plurality of quantized values, (iii) comparing the current frequency to the reference mean frequency of the particular quantized value determined in the second stage, and (iv) selectively indicating that the signal is changing dependent on the comparing.

According to another aspect of one or more embodiments of the present invention, a computer-readable medium that has recorded therein instructions executable by processing comprises instructions to: sample a first plurality of quantized values representing analog values of a physical variable in a computing system; updating a frequency of occurrences for each different quantized value in the first plurality of quantized values; calculate a reference mean frequency for each different quantized value in the first plurality of quantized values; sample a second plurality of quantized values representing analog values of the physical variable; calculate a current frequency of occurrences for each different quantized value in the second plurality of quantized values; and determine whether the current frequency for at least one different quantized value in the second plurality of quantized values is statistically different than the reference mean frequency of the at least one different quantized value.

According to another aspect of one or more embodiments of the present invention, a computing system comprises: a sensor arranged to monitor a physical variable of the computing system, where the sensor is further arranged to output quantized values representative of actual values of the physical variable; and an integrated circuit arranged to process instructions for (i) updating a current frequency of occurrences for each different quantized value generated from the sensor, (ii) comparing the current frequency of a particular quantized value to a reference mean frequency of the particular quantized value, and (iii) indicating that the physical variable is changing dependent on the comparing.

According to another aspect of one or more embodiments of the present invention, a technique for detecting changes in a signal measured by quantization, comprises: sampling a first plurality of quantized values of the signal for a first predetermined amount of time; calculating a frequency of occurrences of at least one different quantized value in the first plurality of quantized values in response to every occurrence of the at least one different quantized value in the first plurality of quantized values; updating a reference mean frequency of at the least one different quantized value in response to every occurrence of the at least one different quantized value in the first plurality of quantized values; sampling a second plurality of quantized values; calculating a current frequency of occurrences of the at least one different quantized value in the second plurality of quantized values in response to an occurrence of the at least one different quantized value in the second plurality of quantized values; determining whether the current frequency is statistically different than the reference mean frequency; and selectively issuing an indication that the signal is changing dependent on the determining.

Other aspects and advantages of the invention will be apparent from the following description and the appended claims.

DETAILED DESCRIPTION

Figure 1:
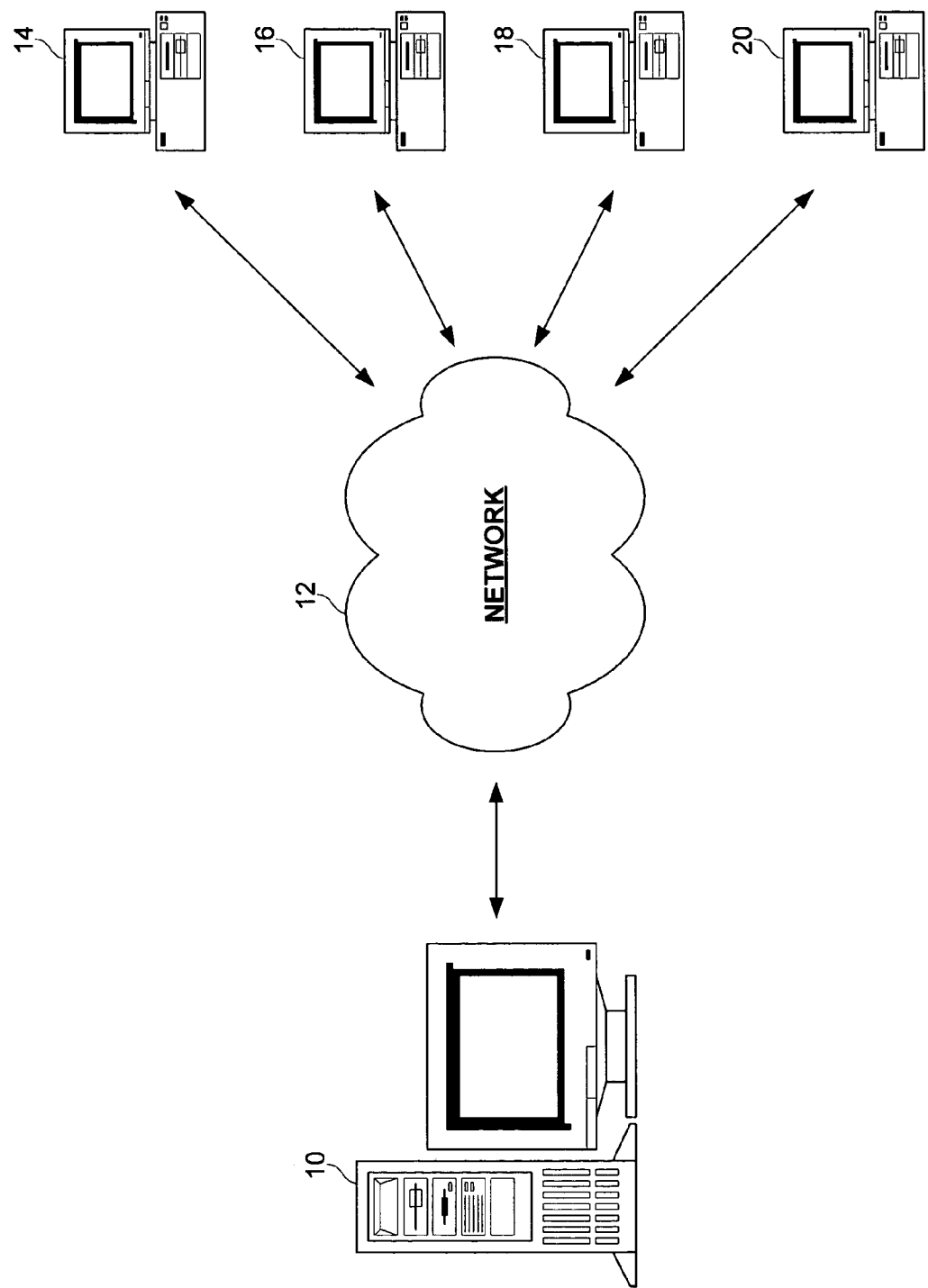
FIG. 1 shows a typical computing environment.
Figure 2:
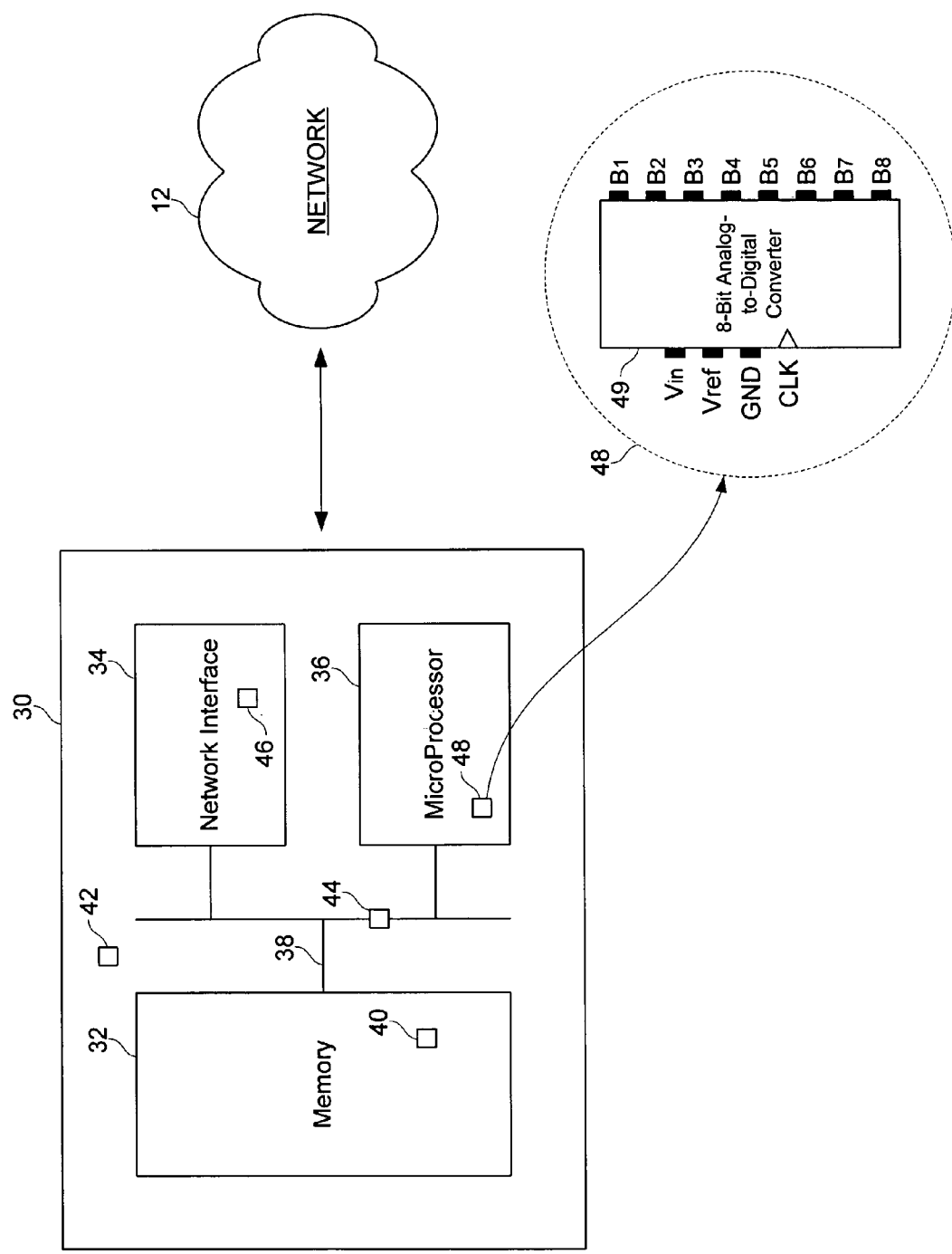
FIG. 2 shows a typical computer system.

As discussed above, a quantized physical variable of a computing system can only take on discrete values and cannot be reported in between these discrete values. Quantization errors are not significant in situations where the objective is only to protect a computing system against catastrophic failures. For example, if a user only wants to know whether a temperature at a location in a computing system gets very hot, e.g., 100 degrees Celsius, or whether a voltage of interest drops very low, e.g., 0.01 V, then quantization error is not of particular significance.

However, if a user is desires achieving proactive fault monitoring to detect the onset of subtle degradation in a computing system well in advance of catastrophic failures, then errors associated with quantization are of greater significance. For example, thin gate oxide transistors are being increasingly used for high-speed applications. Such thin gate oxide transistors typically have fine and low input voltage thresholds. If a physical sensor with an 8-bit analog-to-digital converter is positioned at an input of a particular thin gate-oxide transistor in order to measure and report the values of input voltages to the thin gate-oxide transistor, it is possible that, due to quantization error, the physical sensor reports a quantized value that indicates an acceptable input voltage requiring no special attention when, in fact, the actual value of the input voltage is slightly higher (e.g., 4 mV higher) than the value reported. This voltage difference between the input voltage reported by the physical sensor and the actual input voltage may be high enough to, over time, wear away the gate oxide layer of the thin gate oxide transistor, thereby eventually causing performance degradation and/or outright system malfunction. Those skilled in the art will recognize that various other computing system components other than thin gate oxide transistors also may be adversely susceptible to subtle changes in parameters associated with such other computing system components.

If a signal associated with a physical variable of a computing system is capable of being reported without being quantized (e.g., not via an analog-to-digital converter), then conventional statistical pattern recognition models can be used to detect when the signal starts to drift at the very early stages of system degradation. However, with quantization, such conventional statistical pattern recognition models cannot be used to detect the onset of subtle anomalies that might precede system performance degradation and/or system failure.

Accordingly, at least to guard against the unawareness that a physical variable is changing in advance of a potential system failure, embodiments of the present invention relate to a technique for detecting anomalous changes (referred to herein as "drifts") in signals that are measured and reported using quantization. Such a technique, in accordance with one or more embodiments of the present invention, may detect anomalous changes in a physical variable measured by quantization even when variations in the physical variable are relatively small percentages of the levels of quantization.

In one or more embodiments of the present invention, a technique for detecting changes in a signal measured by quantization involves the use of a "moving" histogram. Such a moving histogram is created and updated over time by (i) sampling a quantized value, (ii) assigning the quantized value to a "bin" for that quantized value, and (iii) determining a frequency ("freq") or percentage of sampled quantized values that are of the "bin" value.

Figure 3:
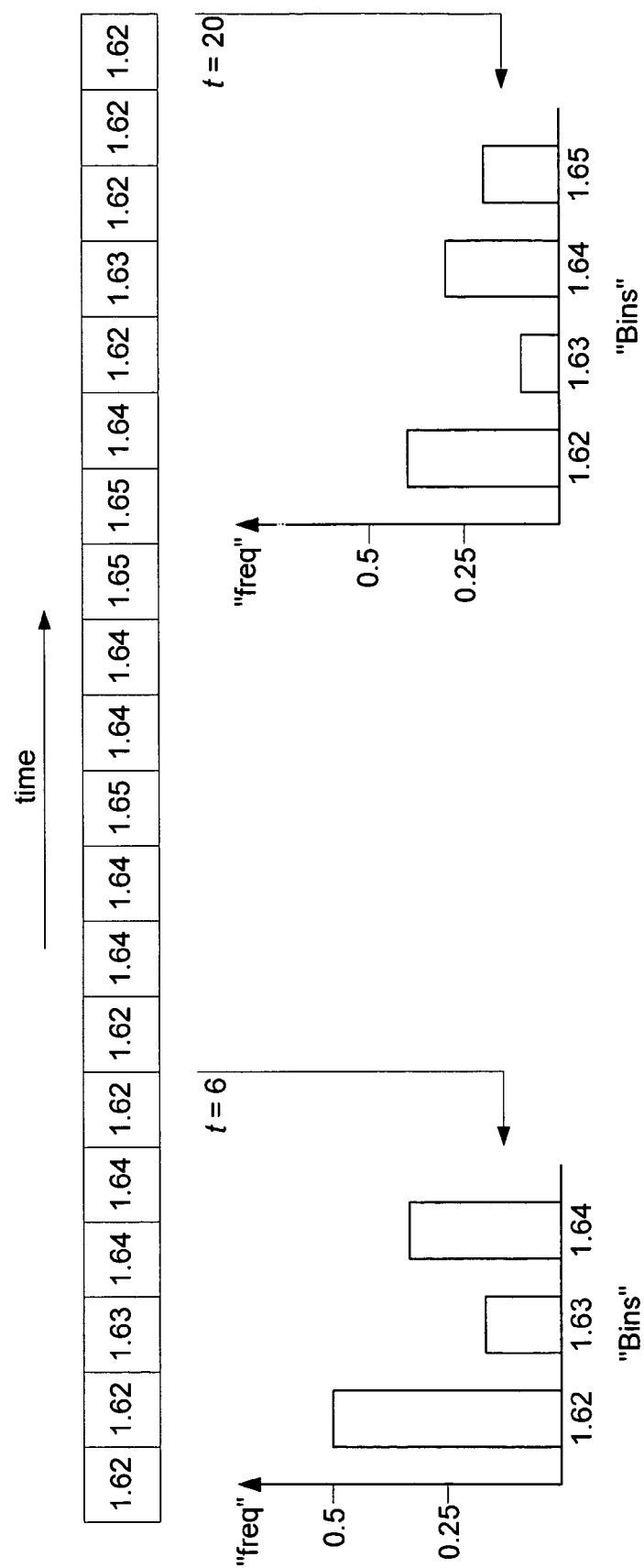
FIG. 3 shows a moving histogram technique in accordance with an embodiment of the present invention.

FIG. 3 shows an exemplary moving histogram technique in accordance with an embodiment of the present invention. In FIG. 3, a quantized value is sampled at every t increment, where every t increment is represented by one block. At t=6, six quantized values have been sampled, and the moving histogram includes the following set of ("bin", "freq") pairs: (1.62, 0.5), (1.63, 0.167), (1.64, 0.333). After each sampling of a quantized value (or after every n samples), the distribution of values in the moving histogram is updated. For example, as shown in FIG. 3, at t=20, the moving histogram includes the following set of ("bin", "freq") pairs: (1.62, 0.4), (1.63, 0.1), (1.64, 0.3), (1.65, 0.2).

Figure 4:
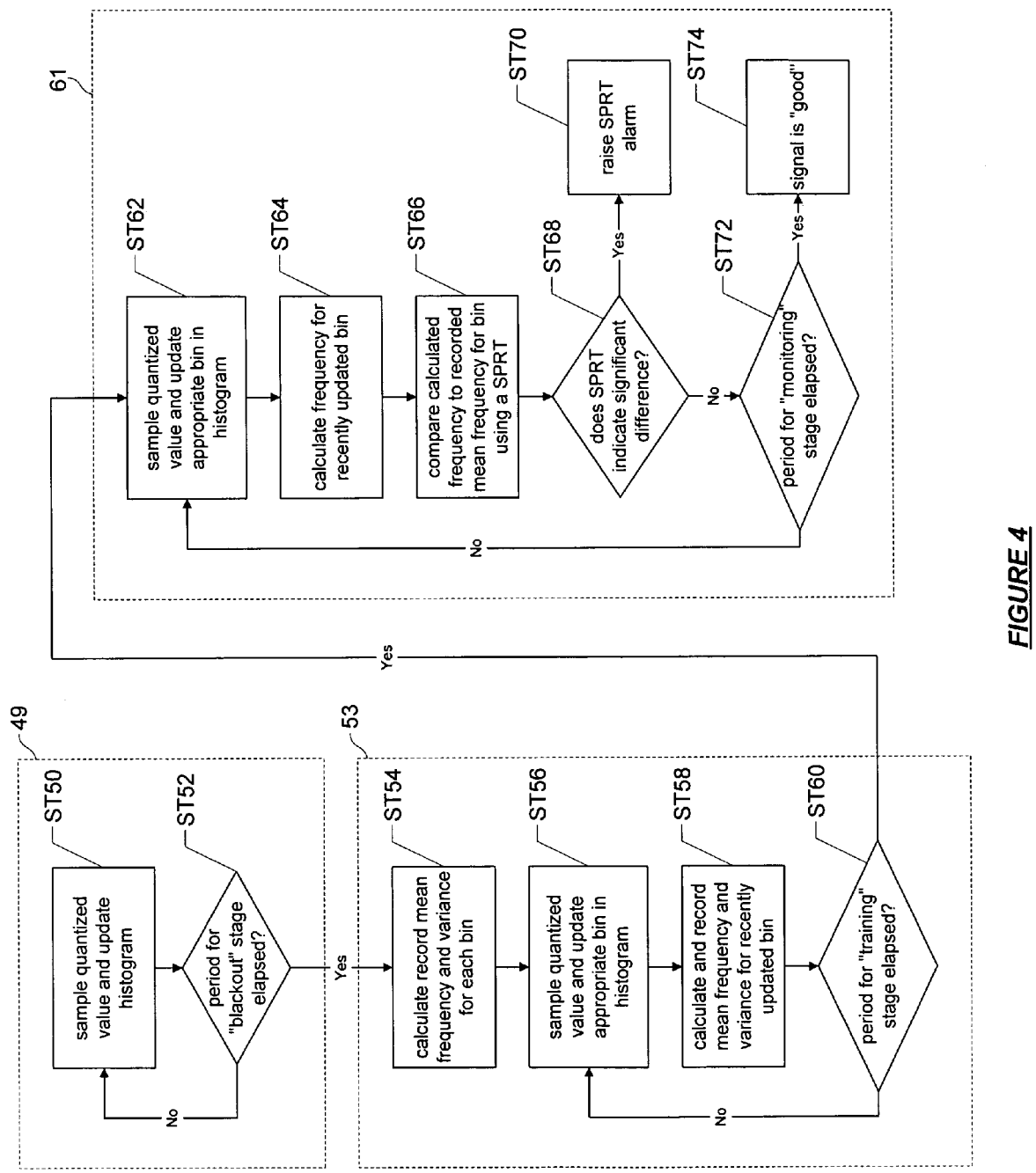
FIG. 4 shows a flow process in accordance with an embodiment of the present invention.

Such moving histograms, as exemplified in FIG. 3, are used in various stages of a technique for detecting changes in a signal measured by quantization. FIG. 4 shows an exemplary flow process describing such a technique in accordance with an embodiment of the present invention. The flow process of FIG. 4 involves three sequential stages: a "blackout" stage 49, a "training" stage 53, and a "monitoring" stage 61.

In the "blackout" stage 49, a quantized value is sampled and the moving histogram is accordingly updated ST50. Then, a determination is made as to whether a time period for the "blackout" stage has elapsed ST52. If the time period has not elapsed, then a next quantized value is sampled and the moving histogram is accordingly updated ST50.

Quantized values continue to be sampled and the moving histogram continues to be accordingly updated until a time period for the "blackout" stage 49 elapses. The "blackout" stage 49 allows the distribution of sampled quantized values in the moving histogram to stabilize to a substantially stationary distribution. In one embodiment of the present invention, a 24-hour period for the "blackout" stage 49 is appropriate. However, those skilled in the art will recognize that the time period for the "blackout" stage 49 may be different in one or more other embodiments of the present invention.

In the "training" stage 53, the mean frequency and variance for each "bin" in the moving histogram is calculated and recorded ST54. Once the mean frequency and variance for each "bin" in the moving histogram is calculated and recorded ST54, a quantized value is sampled and the moving histogram is accordingly updated ST56. After the moving histogram is updated, the mean frequency and variance of the recently updated "bin" is re-calculated and recorded ST58. Then, if a time period for the "training" stage has not elapsed ST60, a next quantized value is sampled and the moving histogram is accordingly updated ST56, after which the mean frequency and variance of the recently updated "bin" is re-calculated and recorded ST58.

Quantized values continue to be sampled, the moving histogram continues to be accordingly updated, and the mean frequency and variance of the most recently updated "bin" continue to be calculated and recorded until a time period for the "training" stage 53 elapses. At the end of the "training" stage 53, each "bin" has a reference distribution (i.e., a "trained," or "reference," mean frequency and variance). Thus, the "training" stage 53 allows for the accumulation of enough, or a predetermined amount of, information about the reference distribution for each "bin." In one embodiment of the present invention, a 30-hour period for the "training" stage 53 is appropriate. However, those skilled in the art will recognize that the time period for the "training" stage 53 may be different in one or more other embodiments of the present invention.

In the "monitoring" stage 61, a quantized value is sampled and the moving histogram is accordingly updated ST62. After the moving histogram is updated, the frequency of the recently updated "bin" is calculated ST64. The calculated, or current, frequency is then statistically compared to the "trained" mean frequency (i.e., the mean frequency of the "bin" at the end of the "training" stage 53) using a Sequential Probability Ratio Test (SPRT) ST66.

To determine whether the current frequency is statistically different than the "trained" mean frequency (i.e., the mean frequency of the "bin" at the end of the "training" stage 53) ST68, in which case the underlying physical variable would be determined to be anomalously changing (i.e., "drifting"), the following SPRT model may be used:

$$SPRT(i) = SPRT(i-1) + \left[\frac{(x_i - M_0)^2}{2\sigma^2} - \frac{(x_i - M_1)^2}{2\sigma^2}\right],$$

where i represents the sample number of the newly sampled quantized value for a particular "bin," $x_i$ represents the current frequency of the "bin" (i.e., the frequency of the "bin" calculated immediately after the sampling of quantized value i), $M_0$ represents the "trained" mean frequency, $M_1$ represents a mean "bin" frequency value considered to be "bad," and $\sigma^2$ represents a "trained" variance for the "bin" (i.e., the variance of the "bin" at the end of the "training" stage 53). Those skilled in the art will recognize that one or more other embodiments of the present invention may use a sequential testing model that is different from the SPRT model expressed above.

The SPRT model expressed above provides a quantitative framework that enables one to decide between two hypotheses: $H_0$ and $H_1$, where $H_0$ represents a normal (e.g., Gaussian) distribution of frequencies of a particular "bin" with mean $M_0$ (the "trained" mean frequency), and where $H_1$ represents a normal (e.g., Gaussian) distribution of frequencies for that particular "bin" with mean $M_1$. As discussed above, $M_1$ represents a mean "bin" frequency considered to be "bad," or, in other words, indicative of the underlying variable anomalously changing. $M_1$ may be chosen so as to have a certain absolute value or percentage difference from $M_0$. For example, if the "trained" mean frequency $M_0$ of a particular "bin" is 0.25, then one skilled in the art may set $M_1$ to be equal to $M_0$+0.08, or 0.33. In one or more other embodiments of the present invention, for example, one skilled in the art may set $M_1$ to be equal to $M_0$+8% of $M_0$, or 0.27.

In one or more other embodiments of the present invention, the value of $M_1$ may be dependent on $M_0$ plus a factor based on the "trained" variance (or standard deviation thereof). Thus, in certain embodiments, the $H_1$ mean frequency may be expressed in terms of the "trained" variance.

In one embodiment of the present invention, two SPRT calculations are performed for every new sampled quantized value: one to determine whether the underlying physical variable is "drifting up," and one to determine whether the underlying physical variable is "drifting down." With respect to determining whether the underlying physical variable is "drifting up," $M_1$ is set to be a certain absolute value or percentage higher than $M_0$, and with respect to determining whether the underlying physical variable is "drifting down," $M_1$ is set to be a certain absolute value or percentage lower than $M_0$. The value to which $M_1$ is set may depend on how wide a range of particular values a user wants to consider as being acceptable. In other words, $M_1$ may be selectively set depending on how sensitively a user wants to tune an acceptable input range of quantized values. Those skilled in the art will recognize that one or more other embodiments of the present invention may use SPRT models that test either or both the "drifting up" $M_1$ and the "drifting down" $M_1$ with any number of calculations.

Accordingly, at least two SPRT calculations are performed for a "bin" whenever a newly sampled quantized value is of that "bin" value. To determine whether a calculated SPRT value is indicative of the underlying physical variable "drifting," the calculated SPRT value is compared to values A and B:

$$A = \ln\left(\frac{\beta}{1-\alpha}\right), B = \ln\left(\frac{1-\beta}{\alpha}\right),$$

where $\alpha$ represents an error tolerance of deciding $H_1$ (i.e., the distribution of frequencies for the "bin" with mean $M_1$) when $H_0$ (i.e., the distribution of frequencies for the "bin" with mean $M_0$) is true, and where $\beta$ represents an error tolerance of deciding $H_0$ when $H_1$ is true. For example, in one embodiment of the present invention, $\alpha$ may be set to 0.001 and $\beta$ may be set to 0.005.

If the calculated SPRT value is greater than B, $H_1$ is held as being true (i.e., the frequencies for a particular "bin" accumulated during the "monitoring" stage 61 are part of the $M_1$ distribution), thereby leading to the issuance of an SPRT alarm ST70 indicating the underlying physical variable is "drifting." For the case in which the calculated SPRT value is less than A, $H_0$ is held as being "strongly" true (i.e., the frequencies for the "bin" accumulated during the "monitoring" stage 61 are part of the $M_0$ distribution), thereby leading to the conclusion that the underlying physical variable is not "drifting" and is thus "good" ST74. Note that, in one embodiment of the present invention, an underlying physical variable is not determined to be "good" until a predetermined time period for the "monitoring" stage 61 has elapsed ST72. In one embodiment of the present invention, a one week period for the "monitoring" stage 61 is appropriate. However, those skilled in the art will recognize that the time period for the "monitoring" stage 61 may vary or be different in one or more other embodiments of the present invention.

In one or more other embodiments of the present invention, the "monitoring" stage may be carried out indefinitely so as to detect subtle anomalies that may appear at a later time. In other words, the "monitoring stage" may not be limited to a certain predetermined amount of time.

In embodiments of the present invention in which the "monitoring" stage occurs indefinitely and/or is not only used for a certain predetermined amount of time, the distribution of quantized values used for the "monitoring" stage may be reflective of only a particular last period of time. For example, if the "monitoring" stage is in a third week of operation, then, instead of considering the distribution of all quantized values sampled since the end of the "training" stage (i.e., quantized values sampled for the three weeks), the "monitoring" stage may only consider the distribution of all quantized values sampled during the last week. Those skilled in the art will recognize that such a technique may be referred to as a "sliding window" "monitoring" stage.

For the case in which the calculated SPRT value is greater than A and less than B, $H_0$ is held as being "weakly" true. Such a case arises when an underlying physical variable seemingly starts to slowly "drift" but cannot be definitively determined as "drifting" for SPRT alarm purposes due in part to the set error tolerances discussed above.

The exemplary technique discussed above to determine whether an underlying physical variable that is measured and reported by quantization is anomalously changing (i.e., "drifting") may be implemented in software using the following general algorithm:

```
for each quantized sample
{
  if in "blackout" stage
  {
    update appropriate ("bin", "freq") pair for sample
  }
  if in "training" stage
  {
    update appropriate ("bin", "freq") pair for sample;
    calculate and record mean frequency and variance of
      recently updated bin
  }
  if in "monitoring" stage
  {
    update appropriate ("bin", "freq") pair for sample;
    compare recently updated bin's frequency with
      "trained" mean frequency using a SPRT;
    if SPRT indicates statistically significant difference
    {
      raise SPRT alarm
    }
  }
}
```

Those skilled in the art will recognize that the instructions and code for implementing a technique in accordance with one or more embodiments of the present invention may widely vary due to differences in code languages, operating systems, coding style, etc. Further, in one or more embodiments of the present invention, a mechanism may be implemented to consider, or factor in, the occurrence of events in a computing system that may have caused a particular physical variable to expectedly and normally change.

Further, in one or more embodiments of the present invention, if an underlying physical variable is determined to be "drifting," an index for the physical variable may be calculated to determine how significantly the physical variable is changing. Such a calculation may be a simple slope calculation that determines the slope of a line having one endpoint at the value of the physical variable at the end of the "training" stage and another endpoint at the value of the physical variable when the physical variable was determined to be "drifting." For example, a physical variable having a 4 mV drift over one week may have an index of 3.

EXAMPLE

An empirical example of a technique for detecting changes in a signal measured by quantization in accordance with one or more embodiments of the present invention is provided below.

In this example, it can be assumed that a "blackout" stage has been completed and that the moving histogram for quantized values representing an underlying physical variable of interest is stable. The following table, Table 1, is associated with a particular "bin" in the moving histogram and shows the times (t=) at which quantized values equal to the "bin" value are sampled during an exemplary "training" stage.

TABLE 1

"Training" Stage Values

| t = | Frequency | Mean Frequency | Variance |
|---|---|---|---|
| 4 | 1/4 = .25 | .25 | — |
| 7 | 2/7 = .2857 | .2679 | .0003186 |
| 9 | 3/9 = .3333 | .2897 | .001164 |

TABLE 1-continued

"Training" Stage Values

| t = | Frequency | Mean Frequency | Variance |
|---|---|---|---|
| 13 | 4/13 = .3077 | .2942 | .0009342 |
| 17 | 5/17 = .2941 | .2942 | .0007474 |
| 20 | 6/20 = .3 | .2951 | .0006276 |
| 22 | 7/22 = .3182 | .2984 | .0006031 |
| 27 | 8/27 = .2963 | .2982 | .0005282 |

Each time a quantized value equal to the "bin" value is sampled, a frequency is determined by dividing the sample number by the number of total quantized values sampled (i.e., number of quantized values sampled including both quantized values equal to the "bin" value and quantized values that are not equal to the "bin" value). In this example, for purposes of simplicity, one quantized value is sampled for every t increment. Thus, as shown in Table 1, for example, at t=13, a quantized value equal to the "bin" value is sampled for a fourth time since the beginning of the "training" stage, thereby leading to a frequency calculation of 4/13, or 0.3077.

After the frequency is calculated in response to a sampling of a quantized value equal to the "bin" value, a mean frequency and variance up to the point of the last sampled quantized value equal to the "bin" value is determined. Thus, as shown in Table 1, for example, at t=13, the mean of the frequencies calculated in response to a sampling of a quantized value equal to the "bin" value up to and including the frequency calculated at t=13 is determined.

As shown in Table 1, at the end of the "training" stage in this example, the "trained" mean frequency is 0.2982 and the variance $\sigma^2$ is 0.0005282. The following table, Table 2, shows the various values associated with the particular "bin" over time in an exemplary "monitoring" stage.

ing whether the underlying physical variable is "drifting down" is also calculated). As shown in Table 2, $x_i$ is equal to the current mean frequency, $M_0$ is equal to the "trained" mean frequency 0.2982, $M_1$ has been selectively set to 0.3782 ($M_0$+0.08), and $\sigma^2$ is equal to the "trained" variance 0.0005282. Using the values of $x_i$, $M_0$, $M_1$, and $\sigma^2$ for each sampled quantized value equal to the "bin" value, a SPRT value is calculated, which is then compared to the A and B values calculated according to the A and B formulas expressed above with reference to FIG. 4, where $\alpha$ is selectively set to 0.001 and $\beta$ is selectively set to 0.005, thereby leading to an A value of −5.297 and a B value of 6.903. Depending on the comparison of the calculated SPRT value to the A and B values, a determination is made as to whether the underlying physical variable is one of (i) strongly "good" in view of the calculated being less than A, (ii) weakly "good" in view of the calculated being greater than A and less then B, and (iii) "drifting" or "bad" in view of the calculated SPRT value being greater than B.

In this example, as shown in Table 2, the recursive SPRT calculations indicate that the underlying physical variable is not "drifting" up until t=24, at which point the SPRT calculation gives a weakly "good" status. At t=26, the calculated SPRT value exceeds B, thereby indicating that there is a statistically significant difference between the "trained" mean frequency and the frequency of the quantized value being sampled in the "monitoring" stage. Accordingly, at this point, the underlying physical variable is determined to be "bad" in that it is "drifting," or anomalously changing.

The above example is presented only to provide an empirical example of a technique for detecting changes in a signal measured by quantization in accordance with embodiments of the present invention. The values chosen for the various variables are exemplary only and do not limit the scope of the present invention.

TABLE 2

"Monitoring" Stage Values

| i = | t = | $x_i$ | $M_0$ | $M_1$ | $\sigma^2$ | SPRT(i) | A | B | Status |
|---|---|---|---|---|---|---|---|---|---|
| 1 | 4 | 1/4 = 0.25 | .2982 | .3782 | .0005282 | −13.359 | −5.297 | 6.903 | "good" (strong) |
| 2 | 7 | 2/7 = 0.2857 | .2982 | .3782 | .0005282 | −21.310 | −5.297 | 6.903 | "good" (strong) |
| 3 | 10 | 3/10 = 0.3 | .2982 | .3782 | .0005282 | −27.096 | −5.297 | 6.903 | "good" (strong) |
| 4 | 12 | 4/12 = 0.3333 | .2982 | .3782 | .0005282 | −27.838 | −5.297 | 6.903 | "good" (strong) |
| 5 | 15 | 5/15 = 0.3333 | .2982 | .3782 | .0005282 | −28.580 | −5.297 | 6.903 | "good" (strong) |
| 6 | 17 | 6/17 = 0.3529 | .2982 | .3782 | .0005282 | −26.354 | −5.297 | 6.903 | "good" (strong) |
| 7 | 19 | 7/19 = 0.3684 | .2982 | .3782 | .0005282 | −21.780 | −5.297 | 6.903 | "good" (strong) |
| 8 | 21 | 8/21 = 0.3809 | .2982 | .3782 | .0005282 | −15.312 | −5.297 | 6.903 | "good" (strong) |
| 9 | 23 | 9/23 = 0.3913 | .2982 | .3782 | .0005282 | −7.270 | −5.297 | 6.903 | "good" (strong) |
| 10 | 24 | 10/24 = 0.4167 | .2982 | .3782 | .0005282 | 4.620 | −5.297 | 6.903 | "good" (weak) |
| 11 | 26 | 11/26 = .4231 | .2982 | .3782 | .0005282 | 17.478 | −5.297 | 6.903 | "bad" |

Each time a quantized value equal to the "bin" value is sampled, a "current" frequency $x_i$ is determined, where i represents the order number of the quantized value sampled. For example, as shown in Table 2, at t=7, the second instance (i=2) of a quantized value equal to the "bin" value is sampled, thereby leading to a frequency calculation of 2/7, or 0.2857.

Next, a SPRT value for determining whether the underlying physical variable is "drifting up" is calculated using the SPRT model expressed above with reference to FIG. 4 (although not shown in Table 2, a SPRT value for determin- Advantages of the present invention may include one or more of the following. In one or more embodiments of the present invention, a technique for detecting changes in signals measured and reported by quantization allows a user to detect subtle changes in an underlying physical variable of a computing system in advance of a potential failure that may have occurred had the subtle change not been detected.

Further, in one or more embodiments of the present invention, a technique for detecting subtle changes in a physical variable of a computing system may be used even when signals reporting the value of the physical variable are highly quantized.

Further, in one or more embodiments of the present invention, a technique for detecting changes in a physical variable of a computing system may be selectively modified in order to increase or decrease a range of an acceptable distribution of frequencies associated with the sampling of a quantized value representing the physical variable.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining whether a physical variable in a computer system is anomalously changing, wherein values of the physical variable are reported as quantized values, the method comprising:
   calculating a current frequency of occurrences of a particular quantized value of the physical variable in response to an occurrence of the particular quantized value, wherein the physical variable is measured by a physical sensor in the computer system;
   performing a Sequential Probability Ratio Test (SPRT) using the current frequency and a reference mean frequency of the particular quantized value to obtain a SPRT value; and
   issuing an alarm to a user of the computer system when the SPRT value indicates that the physical variable is anomalously changing.

2. The method of claim 1, further comprising:
   determining the reference mean frequency, comprising:
      prior to calculating the current frequency:
         sampling a plurality of quantized values of the physical variable,
         calculating a mean frequency of occurrences of the particular quantized value in the plurality of quantized values, and
         storing the mean frequency as the reference mean frequency.

3. The method of claim 1, wherein performing the SPRT comprises:
   statistically comparing the current frequency to an alternate mean frequency, wherein the alternate mean frequency is a mean frequency of the particular quantized value indicative of the physical variable anomalously changing.

4. The method of claim 1, wherein performing the SPRT comprises:
   calculating a test value, the test value being equal to $$SPRT(i-1) + \left[\frac{(x_i - M_0)^2}{2\sigma^2} - \frac{(x_i - M_1)^2}{2\sigma^2}\right],$$

wherein SPRT(i-1) represents a previously calculated test value, wherein $x_i$ represents the current frequency, wherein $M_0$ represents the reference mean frequency, wherein $M_1$ represents an alternate mean frequency, and wherein $\sigma^2$ represents a variance associated with the reference mean frequency.

5. The method of claim 4, wherein the alternate mean frequency is equal to the reference mean frequency ± a predetermined value.

6. The method of claim 5, wherein the predetermined value is a predetermined percentage of the reference mean frequency.

7. The method of claim 4, wherein the alternate mean frequency is dependent on the variance.

8. The method of claim 4, further comprising:
   comparing the calculated test value to a constant value, wherein the constant value is determined based on a selected error tolerance.

9. The method of claim 8, further comprising:
   calculating the constant value, the constant value being equal to $$\ln\left(\frac{\beta}{1-\alpha}\right),$$

wherein $\alpha$ is a first error tolerance value, and wherein $\beta$ is a second error tolerance value.

10. The method of claim 8, further comprising:
    calculating the constant value, the constant value being equal to $$\ln\left(\frac{1-\beta}{1-\alpha}\right),$$

wherein $\alpha$ is a first error tolerance value, and wherein $\beta$ is a second error tolerance value.

11. The method of claim 1, further comprising:
    calculating an index that represents how significantly the physical variable is anomalously changing.

12. A method for determining whether a physical variable in a computer system is anomalously changing, comprising:
    in a first stage:
       sampling a first plurality of quantized values of the physical variable, wherein the physical variable is measured by a physical sensor in the computer system, and
       calculating a frequency of occurrences for each different quantized value in the first plurality of quantized values;
    in a second stage:
       sampling a second plurality of quantized values of the physical variable,
       updating the frequency of occurrences based on the second plurality of quantized values, and
       calculating a reference mean frequency and a reference variance for each different quantized value in the second plurality of quantized values; and
    in a third stage:
       sampling a third plurality of quantized values of the physical variable,
       calculating a current frequency of occurrences of a particular quantized value selected from the third plurality of quantized values in response to sampling the particular quantized value,
       performing a Sequential Probability Ratio Test (SPRT) using the current frequency and the reference mean frequency of the particular quantized value to obtain a SPRT value, and issuing an alarm to a user of the computer system when the SPRT value indicates that the physical variable is anomalously changing.

13. The method of claim 12, wherein performing the SPRT comprises:
calculating a test value, the test value being equal to $$SPRT(i-1) + \left[\frac{(x_i - M_0)^2}{2\sigma^2} - \frac{(x_i - M_1)^2}{2\sigma^2}\right],$$

wherein SPRT(i−1) represents a previously calculated test value, wherein $x_i$ represents the current frequency, wherein $M_0$ represents the reference mean frequency, wherein $M_1$ represents an alternate mean frequency, and wherein $\sigma^2$ represents the reference variance.

14. The method of claim 13, wherein the alternate mean frequency is a mean frequency of the particular quantized value indicative of the physical variable anomalously changing.

15. The method of claim 13, further comprising:
comparing the calculated test value to a value calculated based on a predetermined error tolerance.

16. A computer-readable medium having recorded therein instructions executable by processing, the instructions to:
sample a first plurality of quantized values representing analog values of a physical variable in a computing system, wherein the physical variable is measured by a physical sensor in the computing system;
record a frequency of occurrences for each different quantized value in the first plurality of quantized values;
calculate a reference mean frequency for each different quantized value in the first plurality of quantized values based on the frequency of occurrences;
sample a second plurality of quantized values representing analog values of the physical variable;
calculate a current frequency of occurrences for each different quantized value in the second plurality of quantized values;
perform a Sequential Probability Ratio Test (SPRT) using the current frequency and the reference mean frequency to obtain a SPRT value; and
issue an alarm to a user of the computing system when the SPRT value indicates that the physical variable is anomalously changing.

17. A computing system, comprising:
a physical sensor arranged to:
monitor a physical variable of the computing system, and
output quantized values representative of actual values of the physical variable; and
an integrated circuit arranged to process instructions for:
recording a reference mean frequency of occurrences of a particular quantized value generated from the physical sensor,
calculating a current frequency of occurrences for the particular quantized value generated from the physical sensor,
performing a Sequential Probability Ratio Test (SPRT) using the current frequency of the particular quantized value and the reference mean frequency of the particular quantized value to obtain a SPRT value, and
issuing an alarm to a user of the computing system when the SPRT value indicates that the physical variable is anomalously changing.

18. The computing system of claim 17, wherein the physical sensor comprises an analog-to-digital converter.

19. The computing system of claim 17, wherein instructions for performing the SPRT comprises instructions for:
calculating a test value, the test value being equal to $$SPRT(i-1) + \left[\frac{(x_i - M_0)^2}{2\sigma^2} - \frac{(x_i - M_1)^2}{2\sigma^2}\right],$$

wherein SPRT(i−1) represents a previously calculated test value, wherein $x_i$ represents the current frequency, wherein $M_0$ represents the reference mean frequency, wherein $M_1$ represents an alternate mean frequency, and wherein $\sigma^2$ represents a variance associated with the reference mean frequency.

20. The computing system of claim 17, wherein the computing system is a server.

21. A technique for determining whether a physical variable in a computer system is anomalously changing, comprising:
sampling a first plurality of quantized values of the physical variable for a first predetermined amount of time, wherein the physical variable is measured by a physical sensor in the computer system;
calculating a frequency of occurrences of a particular quantized value in the first plurality of quantized values;
recording a reference mean frequency of the particular quantized value based on the frequency of occurrences;
sampling a second plurality of quantized values of the physical variable;
calculating a current frequency of occurrences of the particular quantized value in the second plurality of quantized values;
performing a Sequential Probability Ratio Test (SPRT) using the current frequency and the reference mean frequency to obtain a SPRT value; and
issuing an alarm to a user of the computer system when the SPRT value indicates that the physical variable is anomalously changing.

22. The technique of claim 21, further comprising:
sampling a third plurality of quantized values for a second predetermined amount of time prior to sampling the first plurality of quantized values.

23. The technique of claim 21, wherein sampling the second plurality of quantized values occurs for a second predetermined amount of time.

24. The method of claim 1, wherein the physical variable comprises at least one selected from the group consisting of a voltage, a temperature, and a current.

25. The method of claim 12, wherein the physical variable comprises at least one selected from the group consisting of a voltage, a temperature, and a current.

26. The computer-readable medium of claim 16, wherein the physical variable comprises at least one selected from the group consisting of a voltage, a temperature, and a current.

27. The computing system of claim 17, wherein the physical variable comprises at least one selected from the group consisting of a voltage, a temperature, and a current.

28. The technique of claim 21, wherein the physical variable comprises at least one selected from the group consisting of a voltage, a temperature, and a current.

* * * * *